(12) United States Patent
Miles et al.

(10) Patent No.: US 11,143,814 B2
(45) Date of Patent: Oct. 12, 2021

(54) LUMINAIRE STRUCTURE

(71) Applicant: AXIS LIGHTING INC., Lasalle (CA)

(72) Inventors: Andrew Miles, Lasalle (CA); Howard Yaphe, Lasalle (CA); Jamal Carrington, Lasalle (CA)

(73) Assignee: Axis Lighting Inc., LaSalle (CA)

( * ) Notice: Subject to any disclaimer, the term of this patent is extended or adjusted under 35 U.S.C. 154(b) by 0 days.

(21) Appl. No.: 16/899,047

(22) Filed: Jun. 11, 2020

(65) Prior Publication Data
US 2020/0393610 A1 Dec. 17, 2020

Related U.S. Application Data

(60) Provisional application No. 62/859,922, filed on Jun. 11, 2019, provisional application No. 62/991,535, filed on Mar. 18, 2020.

(51) Int. Cl.
*F21V 8/00* (2006.01)
*F21V 23/04* (2006.01)
*F21K 9/61* (2016.01)

(52) U.S. Cl.
CPC .............. *G02B 6/0068* (2013.01); *F21K 9/61* (2016.08); *F21V 23/0442* (2013.01); *G02B 6/0055* (2013.01); *G02B 6/0088* (2013.01); *F21V 2200/20* (2015.01)

(58) Field of Classification Search
CPC ... F21V 23/0442–0492; F21V 2200/20; F21K 9/61; G02B 6/011–0073
See application file for complete search history.

(56) References Cited

U.S. PATENT DOCUMENTS

| 8,282,259 B2 | 10/2012 | Itaya |
| 9,534,771 B2 | 1/2017 | Wu et al. |
| 2015/0219825 A1* | 8/2015 | Wu ...................... G02B 6/0081 362/606 |

* cited by examiner

*Primary Examiner* — Sean P Gramling
(74) *Attorney, Agent, or Firm* — Barnes & Thornburg LLP

(57) ABSTRACT

Disclosed is a luminaire structure, comprising at least one light guide segment having opposed surface regions and defining a dimension therebetween. At least one edge region with at least one LED array configured to form an edge-lit optical coupling with the edge region. The light guide segment further includes a first sensor passage extending between the opposed surface regions to receive a sensor. At least one of the light guide segment, the first sensor passage and/or the sensor is configured so that light delivered to the light guide segment through the edge-lit optical coupling illuminates the light guide segment with reduced optical disruption by the presence of the sensor in the first sensor passage, when compared with a non edge-lit optical coupling configuration.

18 Claims, 8 Drawing Sheets

LUMINAIRE STRUCTURE

CROSS REFERENCE TO RELATED APPLICATIONS

The present application claims the benefit of priority under 35 U.S.C. § 119(e) to U.S. Provisional Application No. 62/859,922, filed Jun. 11, 2019, entitled LUMINAIRE STRUCTURE, and U.S. Provisional Application No. 62/991,535, filed Mar. 18, 2020, entitled LUMINAIRE STRUCTURE. The disclosures set forth in the referenced applications are incorporated herein by reference in their entireties.

The disclosures set forth in the applications referenced below are also incorporated herein by reference in their entities:
1. U.S. application Ser. No. 16/676,109 filed Nov. 6, 2019, entitled REMOVABLE POSITIONING OF LIGHT FIXTURES;
2. U.S. application Ser. No. 29/659,245, filed Aug. 7, 2018, entitled LUMINAIRE STRUCTURE.

FIELD OF THE DISCLOSURE

The present disclosure relates to luminaire structures and associated structures.

BACKGROUND

Wall- and ceiling-mounted luminaires are typically mounted to walls and ceilings and configured to present emitted light either in a direct or indirect light distribution mode. Increasingly, luminaires are being integrated into room- or facility-based lighting wireless control systems. In some cases, luminaires with sensors to collect data for example ambient light levels, to automatically adjust room lighting levels and, more recently, for receiving wireless control messages. However, in most such cases the sensor is placed either in the housing alongside a luminaire lens, or in line with a central axis of the luminaire but in a panel dividing adjacent lens segments. Attempts have been made to locate the sensor in the lens itself, though such configurations have been susceptible to cause undesirable shadowing effects owing to the sensor being between the light source and the lens.

It would thus be desirable to provide novel approaches for mitigating the above-mentioned shadowing effects, or at least to provide the public with one or more useful alternatives.

SUMMARY

An aspect provides a luminaire structure, comprising at least one light guide segment having opposed surface regions and defining a dimension therebetween and at least one edge region. At least one LED array (light emitting diode) is configured to form an edge-lit optical coupling with the edge region. The light guide segment further comprises a first sensor passage extending between the opposed surface regions to receive a sensor, wherein at least one of the light guide segment, the first sensor passage and/or the sensor is configured so that light delivered to the light guide segment through the edge-lit optical coupling illuminates the light guide segment with reduced optical disruption by the presence of the sensor in the first sensor passage, when compared with a non edge-lit optical coupling configuration.

In some example embodiments, the at least one LED array may be aligned with the edge region.

Some example embodiments may comprise a housing segment with an opening to receive the light guide segment therein, and a panel portion extending adjacent the light guide segment on a first side thereof to define a wiring compartment boundary.

In some example embodiments, the panel portion may comprise a second sensor passage which may be configured to be aligned with the first passage to receive the sensor therethrough.

In some example embodiments, the housing segment may have a longitudinal axis, and the light guide segment and panel portion may extend along the housing segment, at least in part, and substantially in parallel with the longitudinal axis.

Some example embodiments may comprise a reflective panel extending across the light guide segment, and/or the reflective panel may be configured to reflect emitted light, from the light guide segment, back to the light guide segment.

Some example embodiments may comprise an optical segment that may be configured to extend along the housing segment, at least in part, and substantially in parallel with the longitudinal axis and on a second side of the light guide segment.

In some example embodiments, the housing segment may have a longitudinal axis, and the light guide segment, the panel portion and/or the optical segment may extend along the housing segment, at least in part, and substantially in parallel with the longitudinal axis.

In some example embodiments, the optical segment may comprise a third sensor passage which may be configured to be aligned with the first sensor passage to receive the sensor.

In some example embodiments, the housing segment may comprise an extruded section defining a pair of side wall portions laterally outwardly spaced from the panel portion, and/or wherein at least one of the side wall portions may be provided with a plurality of tabs to define at least one receiving zone for receiving at least at one of the light guide segment, the LED array, and the optical segment.

In some example embodiments, the at least one edge region may be notched to form an outwardly extending edge region web and/or an incident surface region adjacent the edge region web.

In some example embodiments, the at least one LED array may include first and second opposed boundaries, wherein the first boundary may be configured to contact the edge region web, so as to align the LED array with the incident surface region.

In some example embodiments, the second boundary may be configured to engage a corresponding tab on the housing.

In some example embodiments, the light guide segment may include a pair of edge regions, with each of a pair of LED arrays associated with a corresponding edge region and each of the side walls portions may be outwardly inclined off perpendicular relative to the light guide segment.

In some example embodiments, each of the LED arrays may include first and second opposed boundaries, wherein the first boundary may be configured to contact the edge region web, so as to align the LED array with the incident surface region.

In some example embodiments, the second boundary may be configured to engage a corresponding tab on the housing.

Another aspect provides a luminaire structure, comprising at least one light guide segment having opposed surface regions having a dimension therebetween and at least one edge region. At least one LED array is configured to form an edge-lit optical coupling therewith, the light guide segment further comprising a first sensor passage extending between the opposed surface regions, wherein at least one of the light guide segment and the sensor is configured so that light delivered to the light guide segment through the edge-lit optical coupling the luminaire illuminates the light guide segment without shadowing caused by the presence of the first sensor passage or the sensor therein.

Another aspect provides a luminaire structure, comprising at least one light guide segment having opposed surface regions and defining a first depth dimension therebetween and at least one edge region, at least one LED array configured to form an edge-lit optical coupling with the at least one edge region, the light guide segment further comprising a sensor passage extending between the opposed surface regions to receive a sensor therein.

In some example embodiments, the sensor is located in the sensor passage.

Another aspect provides a luminaire structure, comprising at least one light guide segment having opposed surface regions and defining a first depth dimension therebetween and at least one edge region. At least one LED array is configured to form an edge-lit optical coupling with the at least one edge region. The light guide segment further comprises a first accessory passage extending between the opposed surface regions to receive an accessory therein with a second depth dimension exceeding the first depth dimension, At least one of the light guide segment, the first accessory passage, the LED array, the edge-lit optical coupling, and the accessory is configured so that light delivered to the light guide segment through the edge-lit optical coupling illuminates the light guide segment adjacent the first accessory passage to an extent to substantially offset optical disruptions in the light guide segment otherwise arising from the presence of the first accessory in the first accessory passage.

Another aspect provides a luminaire structure, comprising at least one light guide segment having opposed surface regions and defining a first depth dimension therebetween and at least one edge region. At least one LED array is configured to form an edge-lit optical coupling with the at least one edge region. The light guide segment further comprises a first accessory passage extending between the opposed surface regions to receive an accessory therein, wherein at least one of the light guide segment, the first accessory passage and the edge-lit optical coupling is configured so that light delivered to the light guide segment through the edge-lit optical coupling illuminates the light guide segment to substantially offset optical disruptions in the light guide segment arising from the presence of the first accessory passage or the first accessory therein.

In some example embodiments, the accessory may be a sensor or a directional light source. The at least one LED array may be aligned with the at least one edge region.

In some example embodiments, the light guide segment may include a pair of opposed edge regions, with each of a pair of LED arrays associated with a corresponding edge region.

Some example embodiments may comprise a housing segment with an opening to receive the light guide segment therein, and a panel portion may extend adjacent the light guide segment on a first side thereof to define a wiring compartment boundary.

Some example embodiments may comprise a panel portion which may comprise a second accessory passage which may be configured to be aligned with the first accessory passage to receive the accessory therethrough.

In some example embodiments the housing segment may have a longitudinal axis, and the light guide segment and panel portion may extend along the housing segment, at least in part, and substantially in parallel with the longitudinal axis.

Some example embodiments may comprise a reflective panel which may extend across the light guide segment. The reflective panel may be configured to reflect light emitted from the light guide segment back toward the light guide segment.

Some example embodiments may comprise an optical segment which may be configured to extend along the housing segment, at least in part, and on a second side of the light guide segment.

In some example embodiments, the housing segment may have a longitudinal axis, and the light guide segment, the panel portion and/or the optical segment may extend along the housing segment, at least in part, and substantially in parallel with the longitudinal axis.

In some example embodiments, the optical segment may further comprise a third accessory passage which may be configured to be aligned with the first accessory passage to receive the accessory.

In some example embodiments, the housing segment may further comprise an extruded section which may define a pair of side wall portions laterally outwardly spaced from the panel portion. At least one of the side wall portions may be configured to provide at least one receiving zone for receiving at least at one of the light guide segment, the LED array, and the optical segment.

In some example embodiments, at least one edge region may be configured to form an outwardly extending edge region web and an incident surface region adjacent the edge region web.

In some example embodiments, at least one LED array may include first and second opposed boundaries, wherein the first boundary may be configured to contact the edge region web, so as to align the LED array with the incident surface region.

In some example embodiments, the second boundary may be configured to engage a corresponding region on the housing.

In some example embodiments, at least one of the side wall portions may be outwardly inclined off perpendicular relative to the light guide segment.

Another aspect provides a luminaire structure, comprising at least one light guide segment having opposed surface regions having a dimension therebetween and at least one edge region. At least one LED array is configured to form an edge-lit optical coupling therewith. The light guide segment further comprises an accessory passage extending between the opposed surface regions, wherein at least one of the light guide segment and the edge-lit coupling is configured so that light delivered to the light guide segment through the edge-lit optical coupling illuminates the light guide segment without shadowing caused by the presence of the accessory passage or an accessory therein.

BRIEF DESCRIPTION OF THE FIGURES

Several example embodiments of the present disclosure will be provided, by way of examples only, with reference to the appended drawings, wherein.

DETAILED DESCRIPTION

Figure 1:
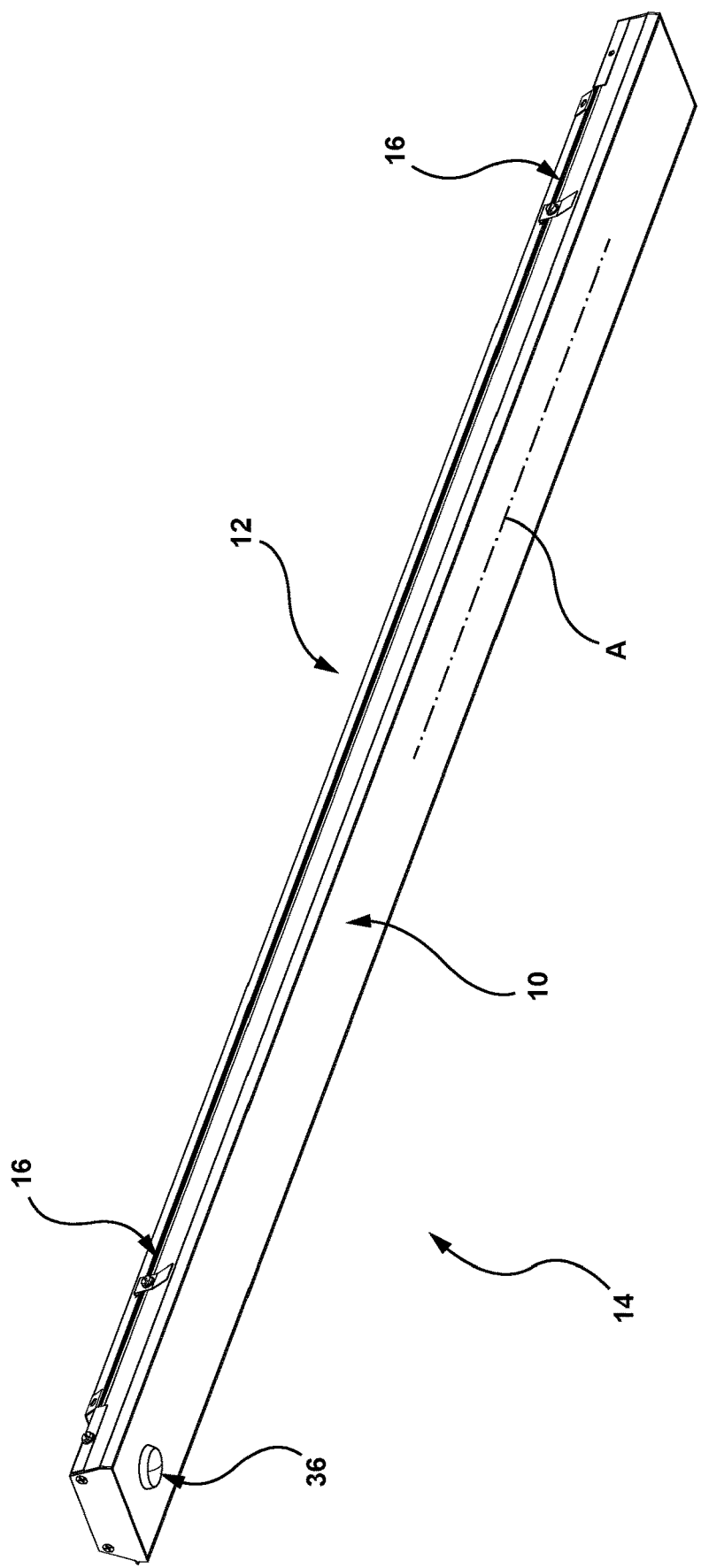
FIG. 1 is a perspective view of a luminaire structure.
Figure 2:
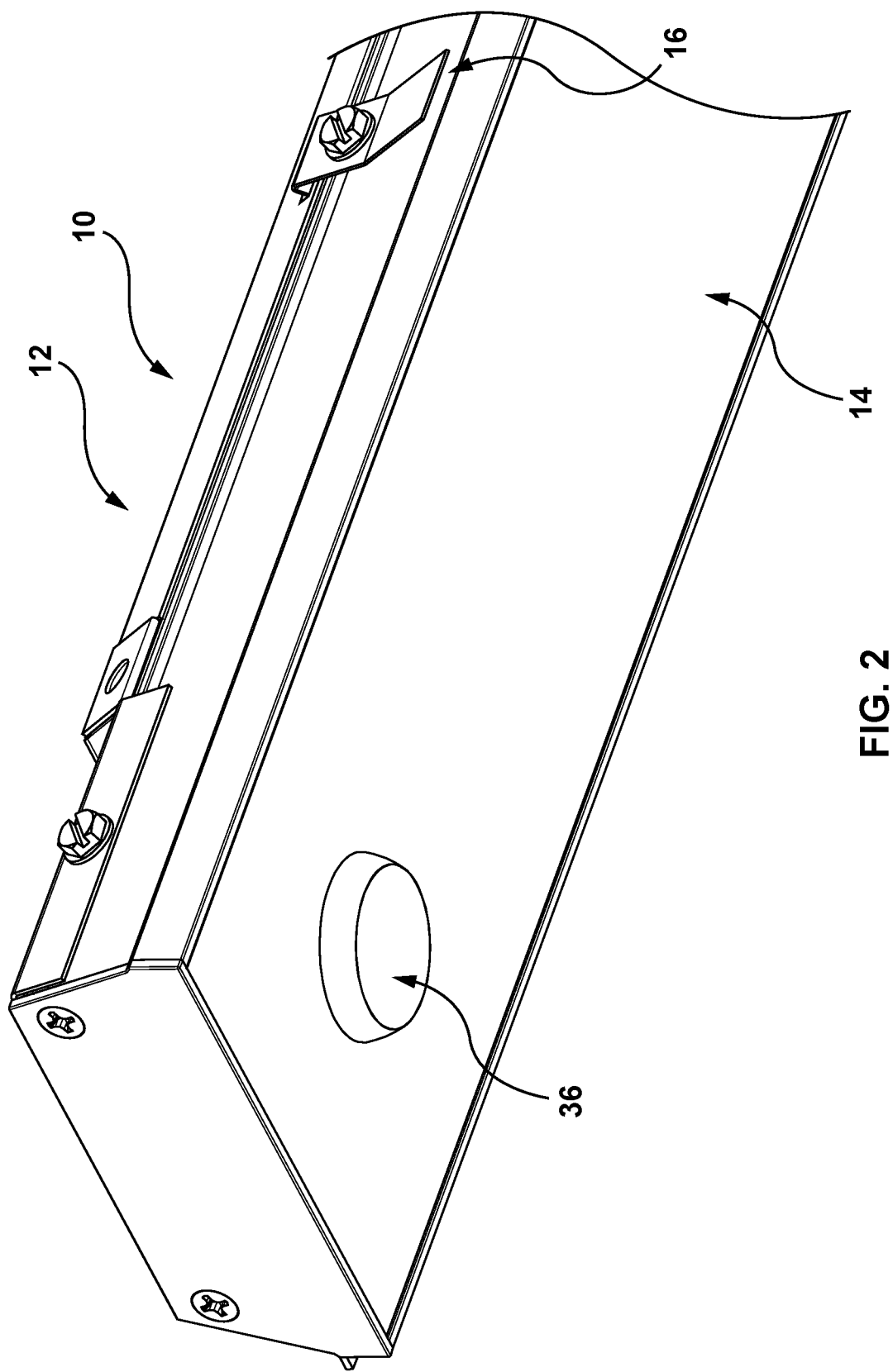
FIGS. 2 and 7 are enlarged perspective views of a portion of the luminaire structure of FIG. 1.

It should be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical, mechanical or other connections or couplings. The terms upper, lower, and vertical are intended for operative context only and are not necessarily intended to limit the invention only to those configurations or orientations. Furthermore, and as described in subsequent paragraphs, the specific mechanical and/or other configurations illustrated in the drawings are intended to exemplify embodiments of the invention. However, other alternative mechanical and/or other configurations are possible which are considered to be within the teachings of the instant disclosure.

The term "non edge-lit optical coupling configuration" herein may include, but not be limited to a luminaire in which a light source delivers light to a luminaire optic in configurations that do not include an edge lit coupling of the light source with a light guide forming the luminaire optic.

The term "LED" used herein may include, but not be limited to, semiconductor, electroluminescent, organic, polymeric or other material based light sources commonly known as generally as light emitting diodes, as well as polymeric and other such light sources, equivalents and variants thereof.

Referring to the figures, there is provided a luminaire structure 10 having a housing segment 12 with a lens or other optical segment shown at 14. As shown in FIG. 1, the housing segment 12 is provided with a plurality of flat spring elements, with a pair shown at 16 in a releasable mounting configuration described in the above referenced U.S. application Ser. No. 16/676,109 incorporated by reference in its entirety. The term "flat spring" is synonymous with the term "leaf spring" and is a class of springs made from a piece of flat plate spring steel or other resilient materials such as plastics, as opposed to a coil spring or a wire spring, made from wire-like spring steel or other resilient material.

Figure 3:
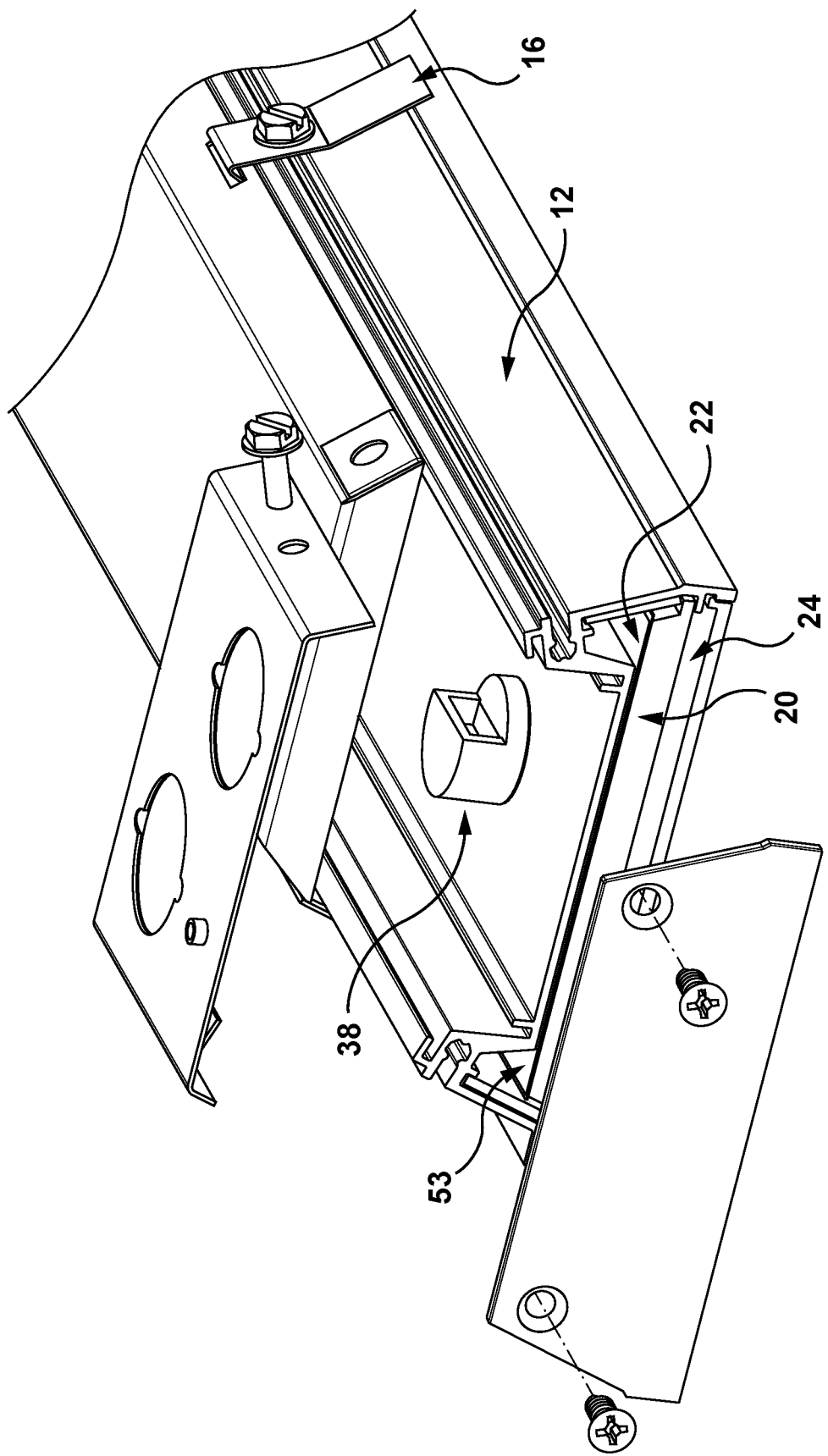
FIG. 3 is an enlarged partial assembly view of the portion of the luminaire structure of FIG. 2.
Figure 4:
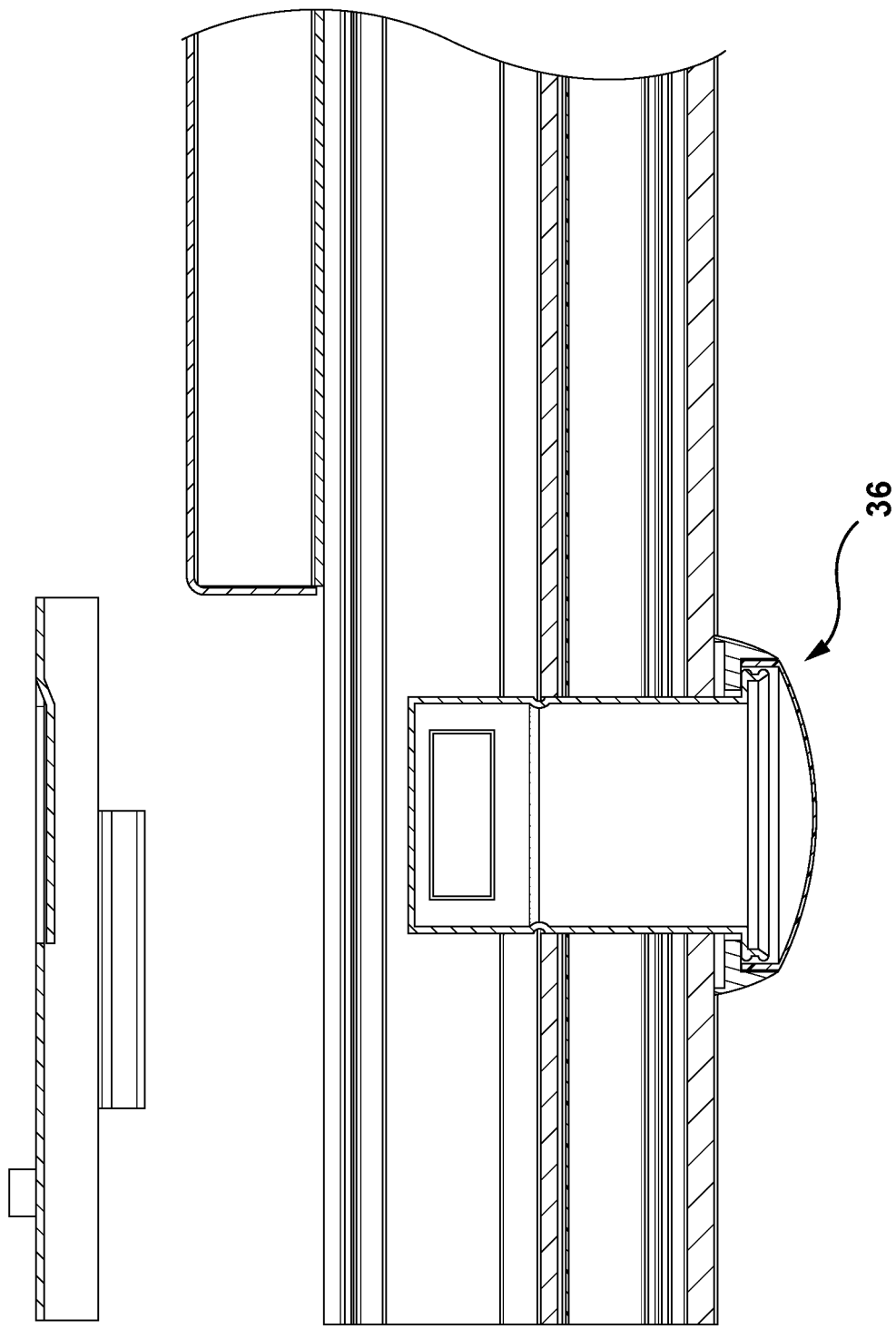
FIG. 4 is a sectional view of a portion of the luminaire structure of FIG. 1 taken along axis A.
Figure 6:
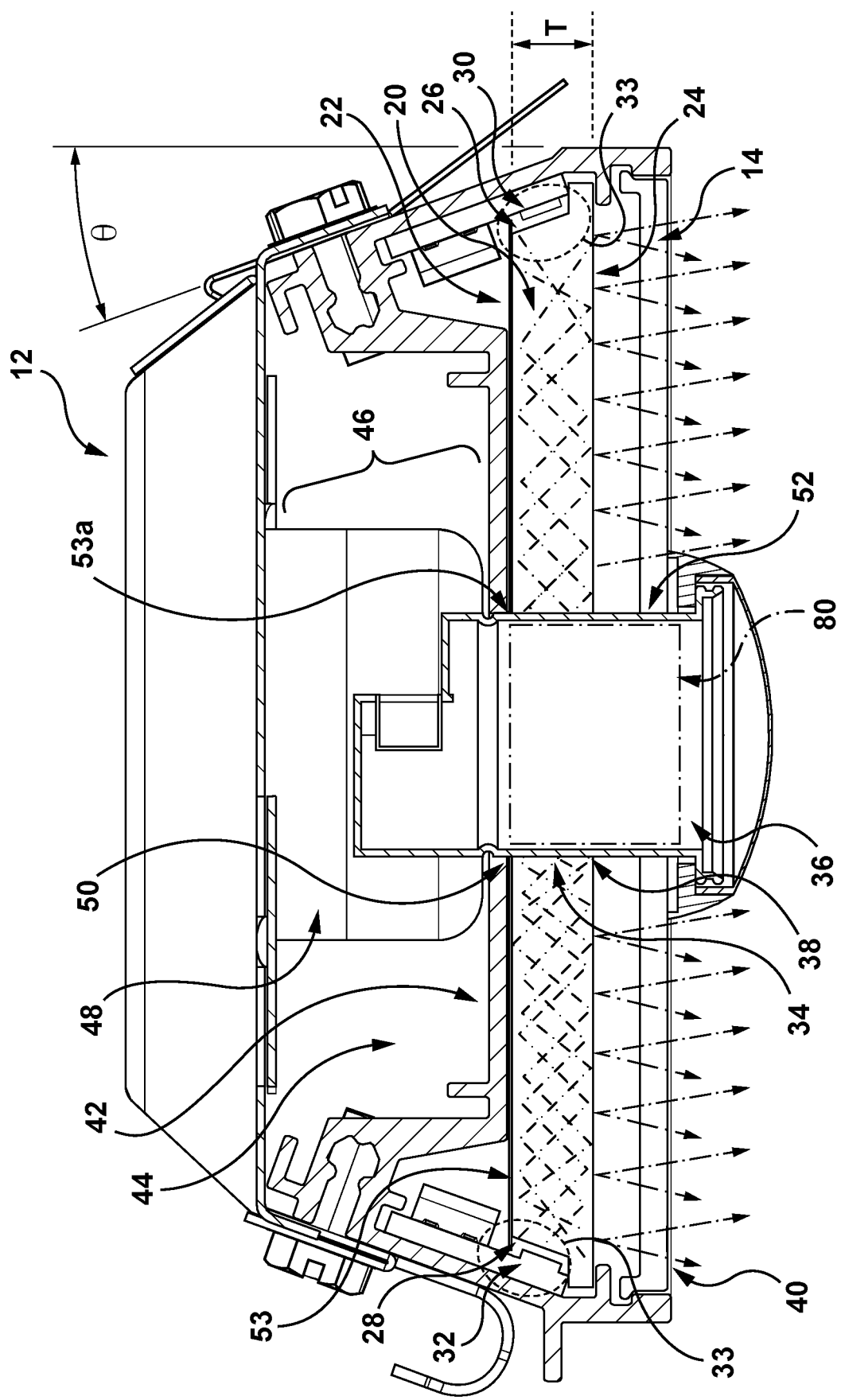
Figure 7:
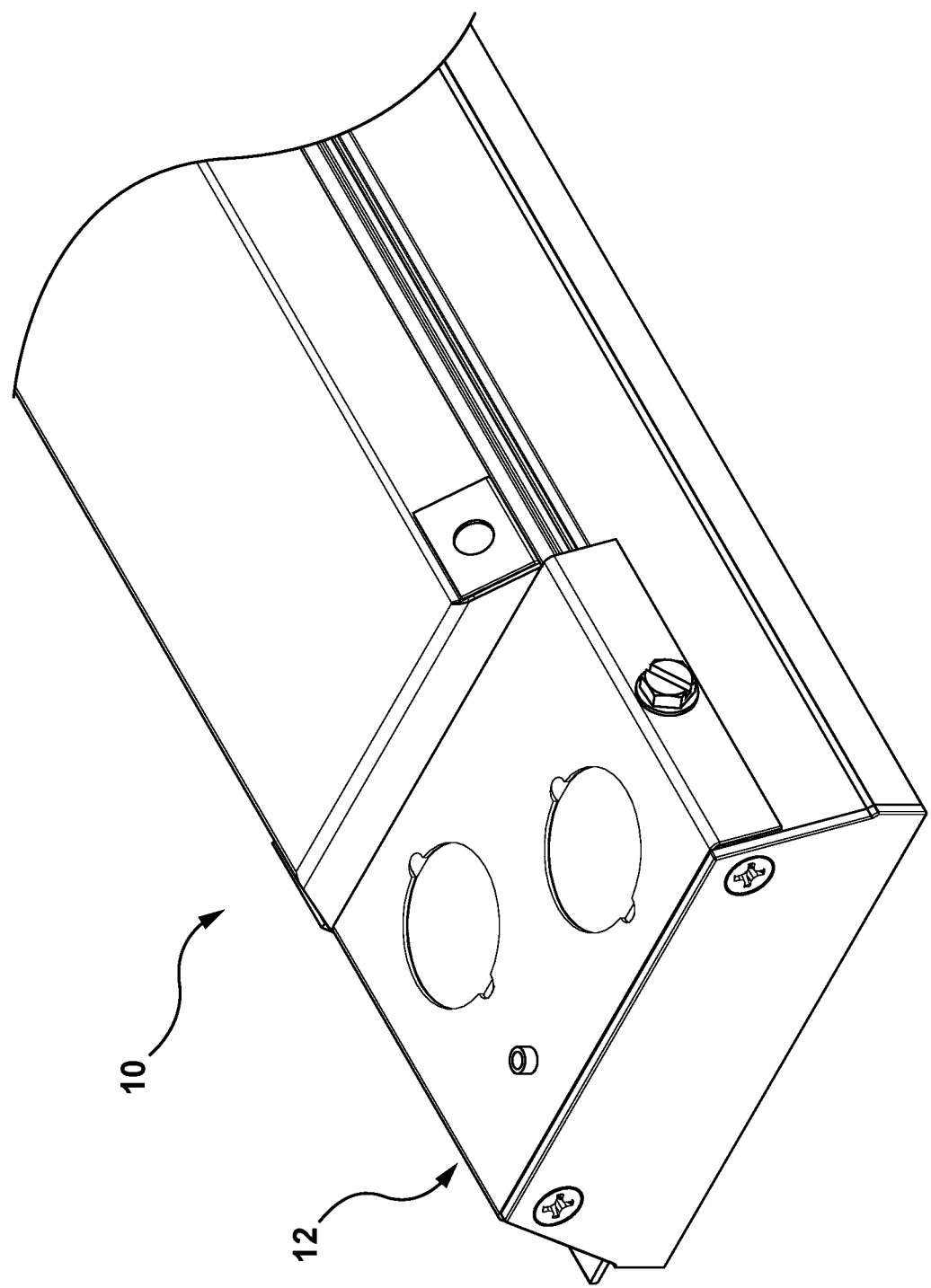
Figure 8:
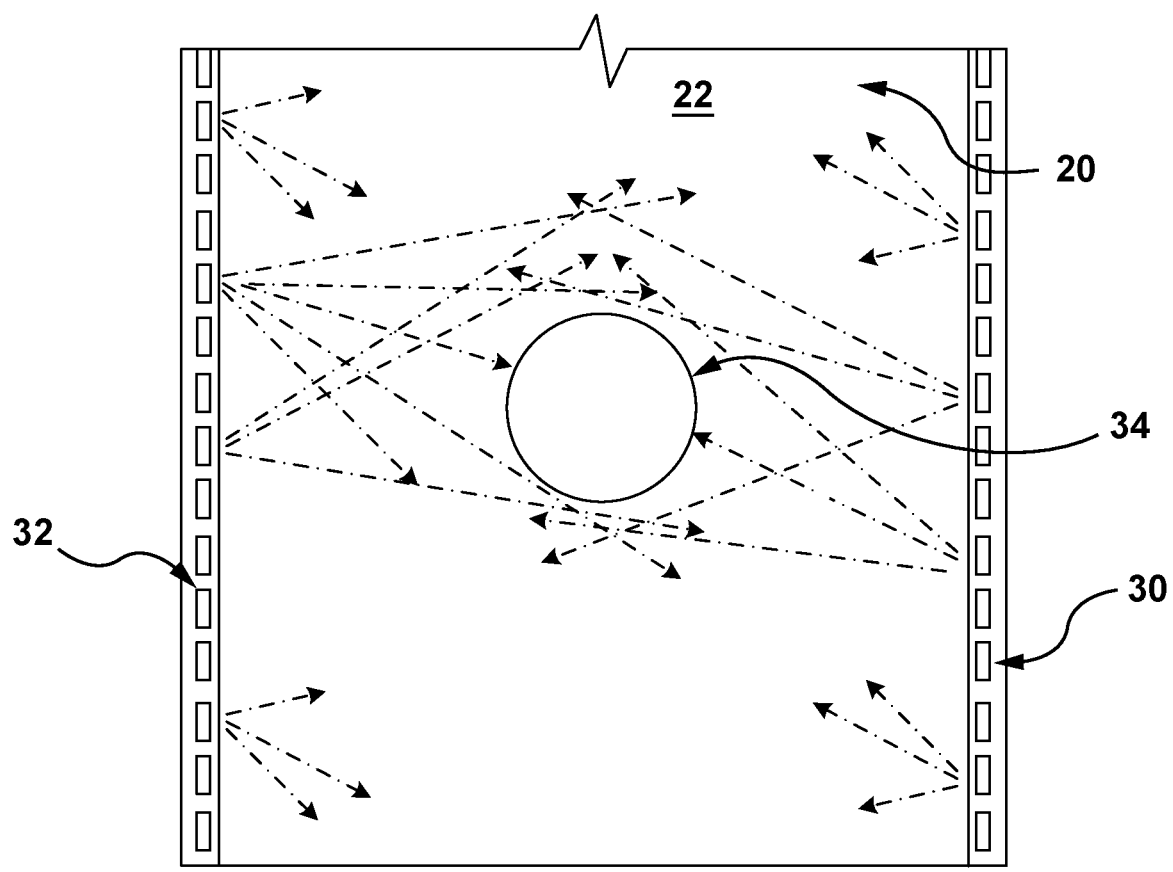
FIG. 8 is a schematic plan view of a light guide segment of the luminaire structure of FIG. 1.

Referring to FIGS. 3 and 6, at least one light guide segment 20 is supported in the housing segment 12, with opposed upper and lower surface regions 22 and 24, and defining a dimension (in this example thickness) "T" between them, as well as at least one, in this case a pair of opposed edge regions 26, 28.

In some example embodiments, at least one, and as shown in the illustrations, a pair of LED arrays 30, 32 may each be aligned with, or otherwise arranged relative to, a corresponding one of the edge regions 26, 28, so as to be configured to form a corresponding edge-lit optical coupling therewith, as shown at dashed ovals 33. In some instances, other optical or reflective elements, such as reflectors and the like, may be deployed between the LED arrays and the corresponding edge regions to direct convey and/or focus light from the LED arrays to establish the edge-lit optical coupling 33.

The LED arrays 30, 32 may be configured to form an edge-lit optical coupling with the light guide segment 20 in other configurations. For example, at least one LED array may be provided in an edge-lit optical coupling 33 with one edge region only.

In some example embodiments, the light guide segment 20 may be configured with a first accessory (or sensor) passage 34 extending between the opposed surface regions 22, 24, to receive an accessory, such as a sensor 36. In this case, at least one of the light guide segment 20 and the sensor 36 may be configured so that light delivered to the light guide segment 20 through the edge-lit optical couplings 33 may illuminate the light guide segment 20 with reduced optical disruption by the presence of the first sensor passage 34, and the sensor 36 therein, when compared with a non edge-lit optical coupling configuration. An example of a sensor is the Enlighted Micro Sensor available at enlightedinc.com. The sensor 38, in this example, can be seen with a vertical dimension exceeding the dimension T.

In some example embodiments, the sensor 36 may be provided with a sensor body 38 with a substantially non-reflective surface so as to minimize reflections of light emitted from the light guide in the first sensor passage 34. In other cases, there sensor body 38 may be configured with a reflective surface.

As can be seen in FIG. 6, the housing segment 12 has an opening 40 to receive the light guide segment 20 and lens 14 therein.

In some example embodiments, a panel portion 42 may be configured to extend adjacent the light guide segment 20, in this case adjacent the upper surface region 22, to define a boundary for an interior space 44 within the housing segment 12 to contain a wiring harness generally shown at 46, including wiring and some cases a power supply 48 or other electrical power source components to power both the LED arrays 30, 32 and the sensor 36, thus at least reducing one or more negative optical effects that might be otherwise arise by the visibility of the wiring harness 46 from the lens of the luminaire structure 10. Secondly, the panel portion 42 may be reflective and thus be configured to reflect emitted light from upper surface region 22 of the light guide segment 20 back into the light guide.

In some example embodiments, the panel portion 42 may further comprise a second accessory (or sensor) passage 50, which is configured to be coincident with the first sensor passage 34 to receive the sensor 24 therethrough.

In some example embodiments, the housing segment 12 may be provided with a longitudinal axis "A" (FIG. 1), and the light guide segment 20 and reflective panel portion 42 may extend along the housing segment 12, at least in part, and substantially parallel to the longitudinal axis A.

In some example, embodiments, the lens 14 may be configured to extend along the housing segment 12, at least in part, and substantially in parallel with the longitudinal axis A and on a second side of the light guide. Thus, the lens 14 may be provided with a third accessory (or sensor) passage 52 (FIG. 6), which is configured to be coincident with the first passage 34 to receive the sensor therethrough.

In some example embodiments, which may in some cases be alternatives to, or in combination with, the reflective example of panel portion 42, a reflective panel portion may be provided at 53 which may extend across the light guide segment 20, adjacent the upper surface region 22. The reflective panel portion 53 may be configured to reflect emitted light, from the light guide segment 20, back to the light guide segment 20. The reflective panel 53 may be, for instance, a sheet of flexible material such as MIRO™, available at https://www.alanod.com/products, which may be further provided with a fourth accessory (or sensor) passage 53a which may be configured to be coincident with the first passage 34 to receive the sensor therethrough.

Figure 5:
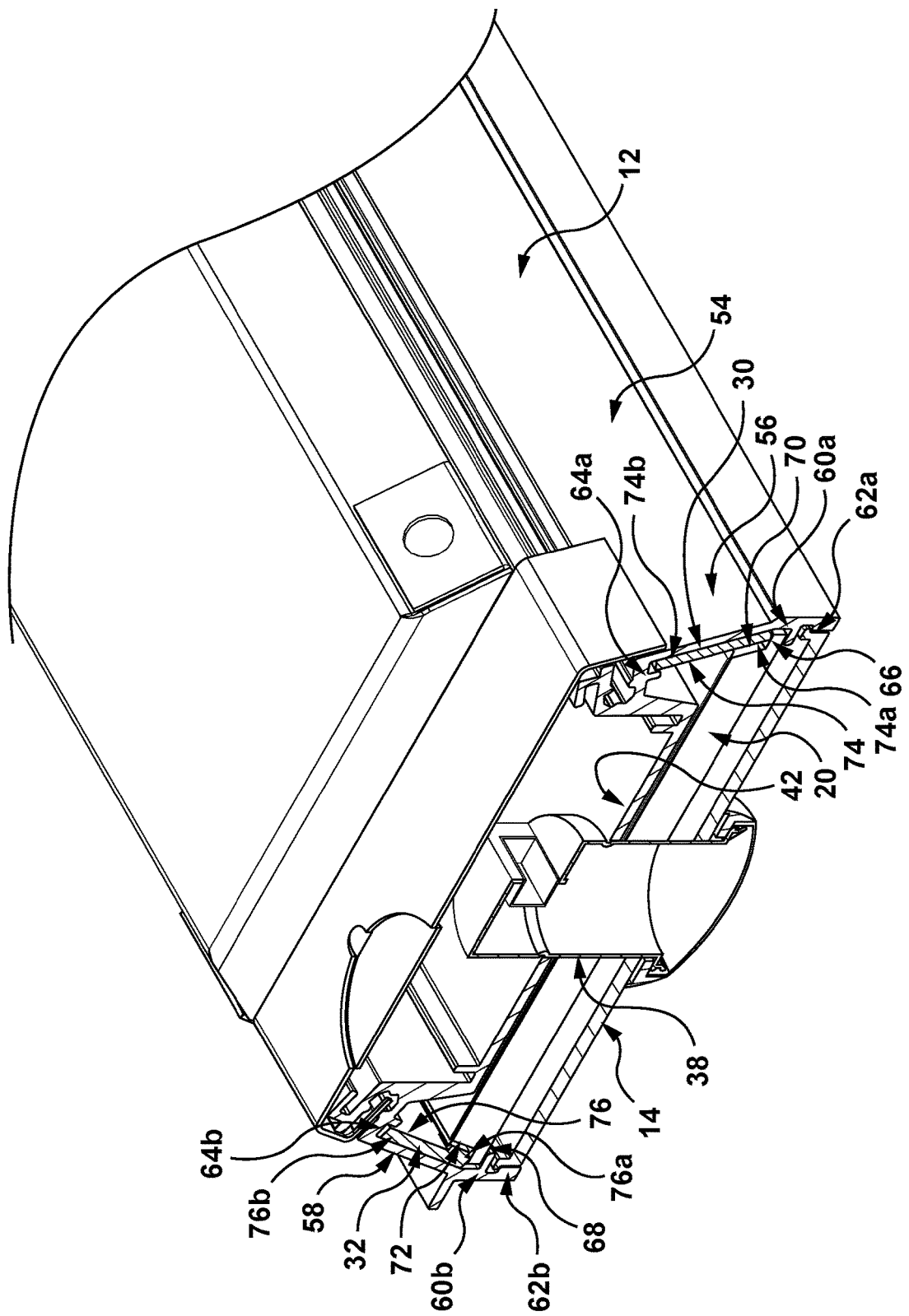
FIGS. 5 and 6 are enlarged sectional views of a portion of the luminaire structure of FIG. 1.

In some example embodiments, as shown in FIGS. 5 and 6, the housing segment 12 may be provided by way of an extruded section shown at 54 defining a pair of sidewall portions 56, 58 laterally outwardly spaced from the reflective panel portion 42. In this case the sidewall portions 56, 58 may be configured with a plurality of tabs or other formations and/or structures, such as first tabs 60a, 60b to define a first receiving zone to receive the light guide segment 20, second tabs 62a, 62b to define a second receiving zone to receive the lens 14, and third tabs 64a, 64b to define a third receiving zone to receive the LED arrays 30 and 32 respectively.

In some example embodiments, as shown in FIG. 5, each edge region 26, 28 may be notched to form an outwardly extending edge region web 66, 68 and an incident surface region 70, 72 adjacent the edge region web 66, 68. Each LED array 30, 32 may include an LED array board 74, 76 with first and second opposed boundaries 74a, 74b, 76a, 76b, wherein each first boundary 74a, 76a may be configured to contact the corresponding edge region web 66, 68, so as to align each LED array 30, 32 with the corresponding incident surface region 70, 72. Meanwhile, each second boundary 74b, 76b may be configured to engage a corresponding tab 64a, 64b on the housing segment 12.

Further, as can be seen in FIG. 6, in some example embodiments, each of the sidewall portions 56, 58 may be outwardly inclined at an angle θ off vertical, or the corresponding angle (90-θ) off perpendicular relative to the light guide segment 20. Thus, the inclined side wall portions together with the notched edge regions 26, 28 and the tabs 64a, 64b may be provide an arrangement in with the LED arrays may be aligned as needed for the edge-lit optical couplings 33 in a low profile luminaire housing.

While some example embodiments herein include sensor 38 extending through one or more sensor passages, some example embodiments may provide for one or more accessory passages in the light guide to receive other accessories, such as a localized light source structure shown schematically at 80 in FIG. 6, in place of the sensor 38, such as a directional LED light for the purposes of illuminating a designated region beneath the luminaire structure 10.

Thus, some example embodiments may provide a sensor which may be integrated into an edge-lit light guide of a luminaire structure, which may allow for occupancy control and data gathering for a luminaire assembly formed of one or more of such luminaire structures, while maintaining substantially complete or continuous fixture illumination, and/or while not noticeably compromising on aesthetics. Such compromises can arise in non edge-lit optical coupling configurations by the presence of shadows or other stray visual or optical discontinuities which may arise from the presence of a sensor in a lens or other output of a light fixture in cases where the sensor would thus necessarily be stationed between at least a portion of the lens 14 or other output and a light source, and/or while placing the sensor 36 in an optimal signal receiving position external to the luminaire structure 10 to receive wireless control messages.

While the present disclosure describes various example embodiments, the disclosure is not so limited. To the contrary, the disclosure is intended to cover various modifications and equivalent arrangements, as will be readily appreciated by the person of ordinary skill in the art.

The invention claimed is:

1. A luminaire structure, comprising at least one interior light guide segment having opposed surface regions and defining a first depth dimension therebetween and at least one edge region, at least one LED array configured to form an edge-lit optical coupling with the at least one edge region, the interior light guide segment further comprising a first accessory passage extending between the opposed surface regions to receive an accessory therein, further comprising a housing segment having opposed boundaries defining an opening therebetween to receive the interior light guide segment therein, the housing segment including a panel portion having a first surface extending along the opening from one of the opposed boundaries to another of the opposed boundaries and adjacent the interior light guide segment on a first side thereof and configured to receive the accessory, the panel portion having a second surface opposite the first surface which is configured to define a wiring compartment boundary.

2. The luminaire structure as defined in claim 1, wherein the accessory has a second depth dimension exceeding the first depth dimension.

3. The luminaire structure as defined in claim 1, wherein the accessory is a sensor.

4. The luminaire structure as defined in claim 1, wherein the at least one LED array is aligned with the at least one edge region.

5. The luminaire structure as defined in claim 1, wherein the interior light guide segment includes a pair of opposed edge regions, with each of a pair of LED arrays associated with a corresponding edge region.

6. The luminaire structure as defined in claim 1, wherein the panel portion further comprises a second accessory passage which is configured to be aligned with the first accessory passage to receive the accessory therethrough.

7. The luminaire structure as defined in claim 6, wherein the housing segment has a longitudinal axis, and the interior light guide segment and panel portion extend along the housing segment, at least in part, and substantially in parallel with the longitudinal axis.

8. The luminaire structure as defined in claim 1, further comprising a reflective panel portion extending across the interior light guide segment between the panel portion and the interior light guide segment, the reflective panel configured to reflect light emitted from the interior light guide segment back toward the interior light guide segment.

9. The luminaire structure, as defined in claim 6, further comprising an exterior optical segment spaced from the interior light guide segment and configured to extend along the housing segment between the opposed housing boundaries, at least in part, and on a second side of the interior light guide segment.

10. The luminaire structure as defined in claim 9, wherein the housing segment has a longitudinal axis, and the interior light guide segment, the panel portion and/or the exterior optical segment extend along the housing segment, at least in part, and substantially in parallel with the longitudinal axis.

11. The luminaire structure as defined in claim 9, wherein the exterior optical segment further comprises a third accessory passage which is configured to be aligned with the first accessory passage to receive the accessory.

12. The luminaire structure as defined in claim 9, wherein the housing segment further comprises an extruded section defining a pair of side wall portions laterally outwardly spaced from the panel portion, and wherein at least one of the side wall portions is configured to provide at least one receiving zone for receiving at least at one of the interior light guide segment, the LED array, and the exterior optical segment.

13. The luminaire structure as defined in claim 12, wherein the at least one edge region is configured to form an outwardly extending edge region web and an incident surface region adjacent the edge region web.

14. The luminaire structure as defined in claim 13, wherein the at least one LED array includes first and second opposed boundaries, wherein the first boundary is configured to contact the edge region web, so as to align the LED array with the incident surface region.

15. The luminaire structure as defined in claim 14, wherein the second boundary is configured to engage a corresponding region on the housing.

16. The luminaire structure as defined in claim 12, wherein at least one of the sidewall portions is outwardly inclined off perpendicular relative to the interior light guide segment.

17. The luminaire structure as defined in claim 9, wherein the exterior optical segment includes an exterior lens, with a designated optical spacing between the interior light guide segment and the exterior lens.

18. The luminaire structure, as defined in claim 1, further comprising an exterior lens configured to extend along the housing segment between the opposed housing boundaries, at least in part, and on a second side of the light guide segment with a designated optical spacing between the interior light guide segment and the exterior lens.

* * * * *